United States Patent

Bradley

[15] 3,670,364

[45] June 20, 1972

[54] ELECTRICAL FISH SCALER

[72] Inventor: George M. Bradley, 3451 Hanover Drive, Kent, Ohio 44240

[22] Filed: May 21, 1970

[21] Appl. No.: 39,413

[52] U.S. Cl. .................................................. 17/66, 30/272
[51] Int. Cl. ....................................................... A22c 25/02
[58] Field of Search ...................... 17/66, 69, 68, 64; 30/169, 30/171, 172, 272, DIG. 1

[56] References Cited

UNITED STATES PATENTS

| | | |
|---|---|---|
| 3,303,563 | 2/1967 | Peterson ................................. 30/272 |
| 3,432,702 | 3/1969 | Chambers ........................... 30/272 X |
| 1,920,954 | 8/1933 | Benedict .................................... 17/66 |
| 1,400,379 | 12/1921 | Schollmeyer ........................... 30/272 |
| 3,388,470 | 6/1968 | Ufer ........................................ 30/272 |

Primary Examiner—Lucie H. Laudenslager

[57] ABSTRACT

A fish scaling device for fast and easy removal of scales from the fish. This device incorporates a pair of toothed blades which slide against each other in an oscelating fashion. The device includes also a handle which will contain a battery and motor for the operation of the blades or the handle will have cord means and plug means for plugging it into an electrical outlet.

1 Claim, 2 Drawing Figures

PATENTED JUN 20 1972  3,670,364

INVENTOR.
George M. Bradley

ELECTRICAL FISH SCALER

This invention relates to fish scalers, and more particularly to an electrically operated fish scaler.

It is therefore the main purpose of this invention to provide an electric fish scalling device which has slideable blades, the blades having teeth which are to effectively remove the scales from a fish.

Another object of this invention is to provide an electric fish scaler which will have pen and stock means on the blades of the device which will keep the blade in alignment at all times.

A further object of this invention is to provide a scalling device which will be operated by motor means in the handle.

Other objects of the present invention are to provide an electrical fish scaller which is simple in design, inexpensive to manufacture, rugged in construction, easy to use and efficient in operation.

Figure 1:
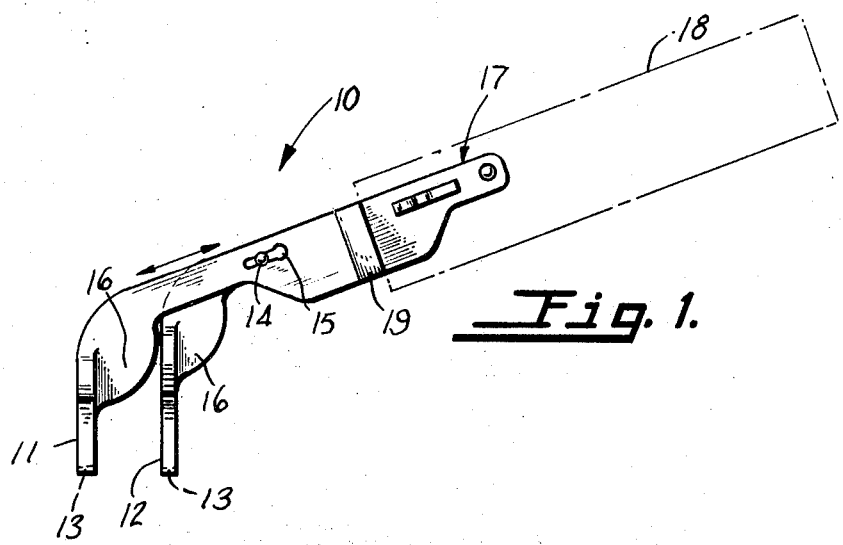
Figure 2:
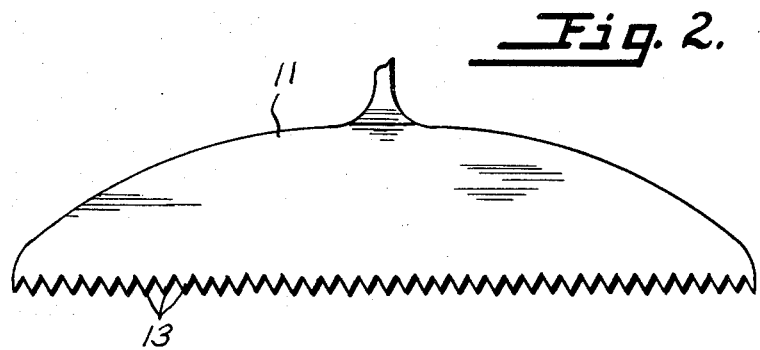

These and other objects will become readily evident upon a study of the following specification together with the accompanying drawing wherein:

FIG. 1 is a side view of the present invention shown in elevation with the handle portion shown in phantom lines; and FIG. 2 is an enlarged front view of one of the blade members shown in elevation and removed from FIG. 1.

According to this invention, an electric fish scaling device 10 is shown to include a pair of blades 11 and 12 having a plurality of teeth 13 for dislodging the scales from the fish. Blade 12 is provided with a projecting pin 14 which is slideable within an elongated slot 15, the combination thereof providing a means for keeping blades 11 and 12 in alignment. Blades 11 and 12 are also provided with a central web 16 portion which has rigidity thereto. The end 17 of device 10 is snapably engaged within handle 18 which abuts with the projection 19 on each side of device 10. The device maybe operated by any conventional power means.

It shall be noted that the device 10 may also be operated if desired, by the use of a cord and plug, the plug being placed into an electrical outlet.

What I now claim is:

1. In an electrical fish scaler, the combination of a pair of flat blades which are parallel to each other but which are disposed transversely respective to an axis of a longitudinally extending handle, each of said blades being provided with a toothed edge for dislodging the scales from a fish, each of said blades being provided with a central web at right angle to the plane of said blade, each said central web having a continuing extension into said handle, said central webs of said blades being positioned adjacent each other, one of said webs being provided with a sidewardly extending projection pin which is slideable within an elongated slot provided in the other web of the other said blade, said blades accordingly being slideable respective to each other for being selectively closer together or further apart, an electric motor within said handle or sliding said blade, and a projection on opposite sides of said web extensions, said projections abutting with said handle.

* * * * *